United States Patent Office 2,906,561
Patented Sept. 29, 1959

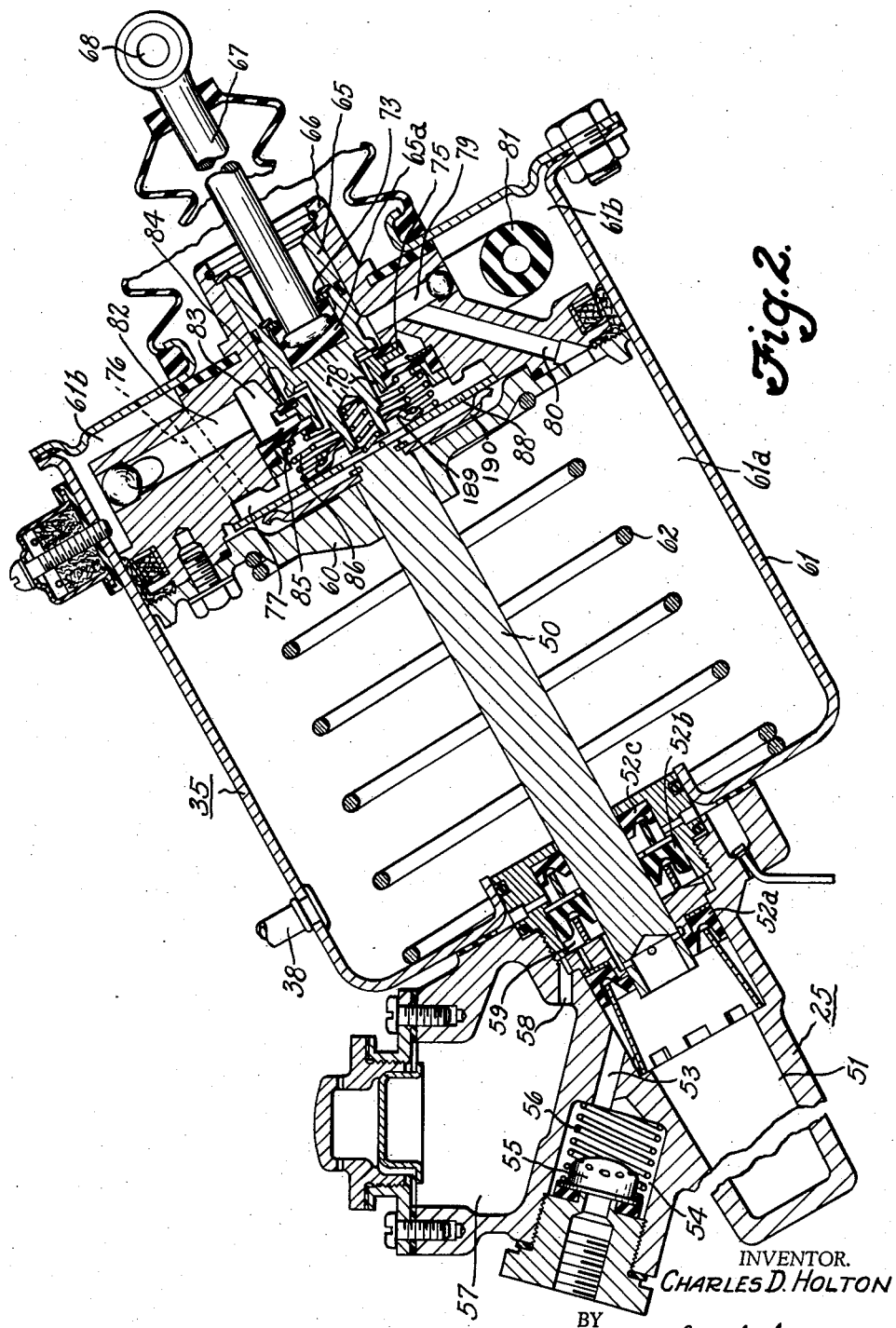

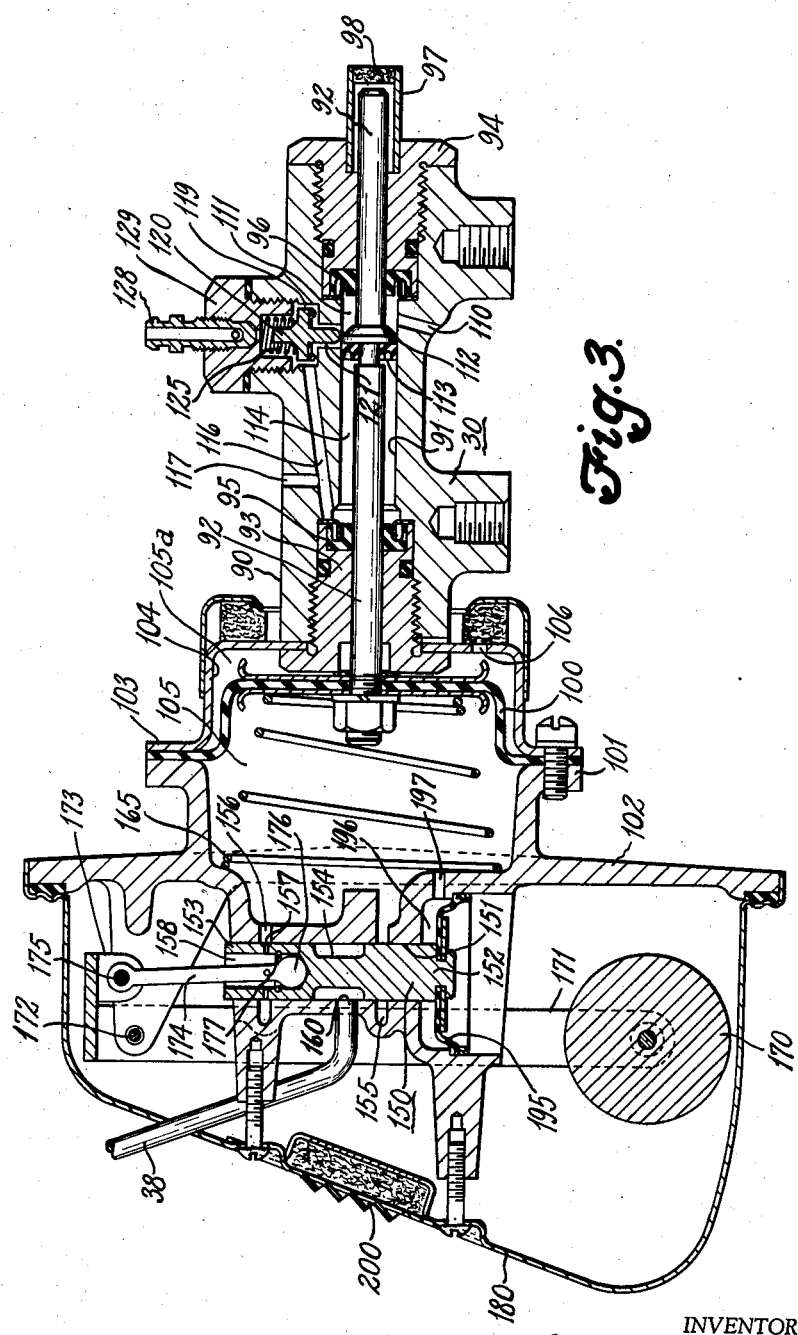

2,906,561

BRAKE SYSTEM

Charles D. Holton, Clio, Mich., assignor to General Motors Corporation, Detroit, Mich., a corporation of Delaware Application June 14, 1957, Serial No. 665,702

10 Claims. (Cl. 303—24)

This invention relates to brake systems for motor vehicles.

In bringing an automotive vehicle to a stop, it is well-known that it is the retarding force effected between the tire and the road surface that causes the vehicle to stop. The magnitude of the retarding force is a result of the force holding the wheel against the road surface and the coefficient of friction of the tire on the road surface. It has been determined that the coefficient of friction of the tire on the road surface is at its highest when the tire is just "marking" the road but is not sliding. If the wheel locks and slides there is a reduction of the retarding force and a loss of control. If the rear wheel should lock and slide, the vehicle usually goes into a skid, and if a front wheel locks, loss of steering control results.

It is therefore apparent that the minimum stopping distance as well as maximum control of the vehicle is obtained when all wheels are retarding the deceleration of the vehicle with a force just below that at which the wheel will lock up under the specific road surface condition.

When a vehicle is at rest, there is a normal load distribution of the vehicle between the front and rear wheels to which the brakes are adjusted in a manner that, under normal conditions, the front and rear wheels of the vehicle will lock up at substantially the same time. However, with the center of gravity of the vehicle being a substantial distance above the road surface, when a vehicle decelerates, there is a couple about the center of gravity that results in a shifting of load distribution to the extent that the force applied downwardly on the front wheels increases and the force applied downwardly on the rear wheels decreases. Under these circumstances the rear wheel tend to lock up and slide more quickly than the front wheels. Therefore normal brake adjustments are a compromise to the extent that the shift in load distribution is taken into consideration when adjusting the front and rear wheels of a vehicle to compensate for a part of the shift of load distribution so that on dry road the front and rear wheels will still lock-up at approximately the same time, if lock-up is to occur.

However, the normal brake effort applied at the front and rear wheels provided by the normal compromise adjustment is unsatisfactory for braking conditions on ice since the coefficient of friction of the tire with the road surface is practically negligible. Under this condition the usual couple about the center of gravity which tends to effect a change in load distribution between the front and rear axle is negligible. Thus the load distribution being substantially the same as a static weight distribution, the front wheel brakes, which have been adjusted to compensate for the normal increase of load distribution, will now tend to lock-up before the rear wheels with the result of loss of steering control.

It is therefore an object of this invention to provide a hydraulically operated brake system in which the front and rear wheel brakes may be adjusted for substantially normal static load distribution of the vehicle to effect lock-up at substantially the same time under this load distribution, and wherein an auxiliary control is provided that is responsive to the rate of deceleration of the vehicle to effect an increase in the brake effort of the front wheel brakes in proportion to the shift of load distribution from the rear wheels to the front wheels of the vehicle as caused by the rate of deceleration of the vehicle.

It is another object of the invention to provide a brake system in accordance with the foregoing object wherein there is provided a first manually controlled power operated brake actuating unit to effect a normal power actuation of both front and rear wheel brakes, and wherein there is provided a supplementary power operated control responsive to the rate of deceleration of the vehicle that will effect an increased brake actuation of the front wheel brakes only over the rear wheel brakes in proportion to the rate of deceleration of the vehicle.

Further objects and advantages of the present invention will be apparent from the following description, reference being had to the accompanying drawings wherein a preferred form of the invention is clearly shown.

In the drawings:

Figure 2 is a longitudinal cross sectional view of a manually controlled power operated brake actuating mechanism to effect normal brake application.

Figure 3 is a longitudinal cross sectional view of a supplementary power operated brake actuating mechanism that is responsive to the rate of deceleration of a motor vehicle to effect brake actuation of the front wheel brakes of the vehicle.

Figure 1:
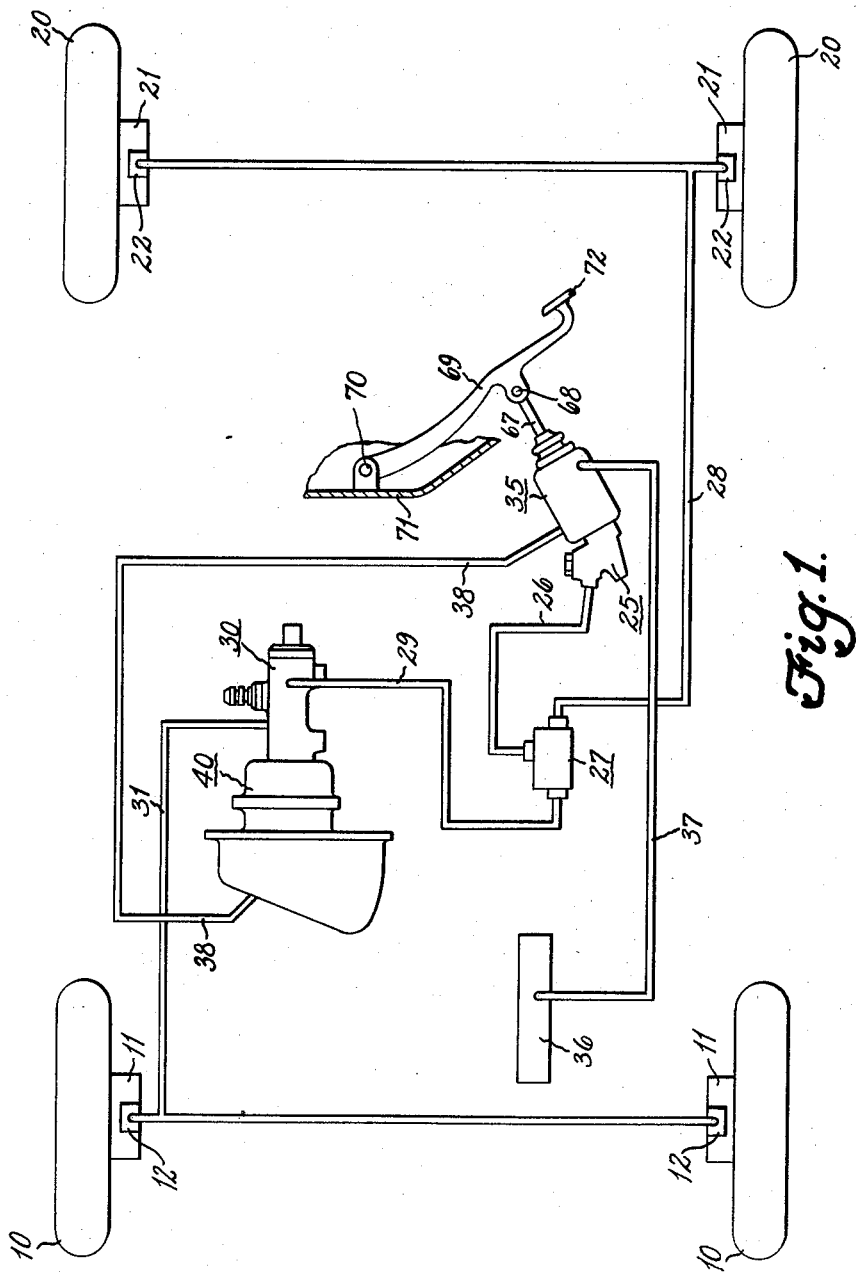
Figure 1 is a schematic representation of a brake system for a motor vehicle incorporating features of this invention.

In this invention the motor vehicle is represented by the front wheels 10 and the rear wheels 20, the front wheels having brakes 11 and the rear wheels having brakes 21. The front wheel brakes 11 each have a hydraulically operated wheel cylinder 12 while the rear wheel brakes each have a hydraulically operated wheel cylinder 22, the wheel cylinders 12 and 22 causing brake actuation of the brake in conventional manner. The brakes 11 and 21 may be of any standard conventional type well-known in the art, and for this reason further description is not given.

The wheel cylinders 12 and 22 are supplied with hydraulic fluid under pressure from a master cylinder 25 through a brake line 26 that connects with a distributing block 27. A hydraulic brake line 28 connects the distributing block 27 with the wheel cylinders 22 of the rear wheel brakes 21. A hydraulic brake line 29 connects the distributing block 27 with a supplementary control valve 30, hereinafter described. The supplementary control valve 30 is connected by means of a brake line 31 with the wheel cylinders 12 of the front wheel brakes 11.

The supplementary control valve 30 is provided with a flow control valve that is normally open so that when the fluid under pressure is displaced from the master cylinder 25 hydraulic fluid will flow to both front and rear wheel cylinders 12 and 22 to effect concurrent brake application of both front and rear wheel brakes 11 and 21.

The supplementary control valve 30 is also adapted to cut off the brake conduit 29 from the brake conduit 31 under certain conditions of deceleration of the motor vehicle so that the supplementary control 30 can effect displacement of hydraulic fluid under pressure through the conduit 31 to the wheel cylinders 12 of the front wheel brakes 11 at an increased rate over the pressure applied to the rear wheel brakes 21 by the master cylinder 25 and in proportion to the shift in load increase to the front wheels of the vehicle resulting from the rate of deceleration of the vehicle.

The brake system arrangement is therefore such that the master cylinder 25 will supply fluid under pressure to both front and rear wheel brakes at the same fluid pressure to effect brake actuation of the respective brakes in accordance with their respective adjustments as established by static weight distribution of the vehicle on the front and rear axles with a slight favoring of greater brake actuation in the front wheel brakes than in the rear wheel brakes to provide for normal brake operation at low rates of deceleration of the vehicle. As the rate of deceleration of the vehicle increases above a pre-selected rate, the supplementary control 30 will become effective as the load distribution of the vehicle shifts to the front wheels to cause a greater degree of brake application at the front wheels of the vehicle in proportion to the degree of load shifting to the front wheels and the rate of deceleration of the vehicle.

The master cylinder 25 of the brake system is actuated by a pressure differential fluid motor 35 that is connected with the manifold 36 of the engine of the vehicle through a conduit 37 with the result that there is power operation of the master cylinder 25.

The pressure differential fluid motor 35 is connected with a pressure differential fluid motor 40 of the supplementary control 30 which effects operation of the control, a conduit 38 connecting the fluid motor 35 with the fluid motor 40 so that the fluid motor 40 can function only when the fluid motor 35 functions.

The manually controlled power operated brake actuating mechanism comprising the master cylinder 25 and the fluid motor 35, as more particularly illustrated in Figure 2, consists of a fluid displacement plunger 50 movable into the cylinder chamber 51 of the master cylinder 25 through the seal members 52a, 52b and 52c that close one end of the master cylinder chamber 51. The master cylinder chamber 51 has an outlet port 53 that communicates with an outlet chamber 54 containing a residual pressure check valve 55 which maintains pressure in the brake lines of the brake system in conventional manner, the valve 55 being held on its seat by a spring 56. A fluid reservoir 57 has a port 58 that communicates with a space 59 between the seal members 52a, 52b so as to provide for flow of refill fluid into the master cylinder chamber 51 around the outer periphery of the seal member 52a when the displacement plunger 50 is withdrawn to its fullest extent.

The displacement plunger 50 is secured to a power piston 60 that is reciprocable in the power cylinder 61 of the pressure differential motor 35. The power piston 60 is positioned normally as shown in Fig. 2 by the compression spring 62. The power piston 60 divides the power cylinder 61 into the two chambers 61a and 61b, the chamber 61b being open to atmosphere at all times whereas the chamber 61a is adapted to be evacuated under certain conditions of operation of the fluid motor 35 by way of its connection to the engine manifold 36 to effect power operation of the displacement plunger 50 into the master cylinder 25.

Power operation of the power piston 60 is effected under regulation of the pressure control valve 65 that is slidable in a boss 66 extending on the right hand side of the power piston 60. This valve 65 is manually controlled by means of a push-rod 67 that has a pivot connection 68 with a brake pedal arm 69 that has a pivot connection 70 on the forward compartment wall 71 of the vehicle body of a vehicle. The lower end of the pedal arm 69 carries a foot pedal 72.

The forward end of the push rod 67 is retained within the valve member 65 by a snap-ring 73 that holds the resilient rubber-like filled member 65a in position in the valve 65. The valve 65 is normally spaced from a valve element 75, as shown in Fig. 2 of the drawing so that atmospheric air can pass from the chamber 61b through the passage 76 into the chamber 77 and thence through the annular chamber 78 and between the valve elements 75 and 65 into the passage 79 by way of passage 80 into the chamber 61a so that normally atmospheric air is present in both chambers 61a and 61b with the pressure differential motor 35 in the position illustrated in Figure 2.

The engine manifold 36 is connected by way of the conduit 37 and the flexible conduit 81 with the passage 82 that connects with the chamber 83 closed by the valve element 75 seating on the annular valve seat 84 with the diaphragm 85 closing the other side of the chamber 83. Compression spring 86 normally holds the valve element 75 on the valve seat 84. A plurality of reaction elements 88, 189 and 190 are provided between the displacement plunger 50 and the valve element 65 to effect reaction of the brake apply pressure in the master cylinder chamber 51 to the displacement plunger 50 and through it to the operating rod 67 to give brake feel to the operator of the vehicle.

To effect power operation of the displacement plunger 50 the valve element 65 is moved in a leftward direction by the plunger 67 to close against valve element 75, thereby closing off passage of atmospheric air to the chamber 61a with additional movement in a left hand direction of effecting lifting of the valve element 75 from the seat 84 to allow vacuum from the engine manifold present in chamber 83 to connect with the chamber 61a to evacuate the same and thereby allow the atmospheric air in chamber 61b to move the power piston 60 in a left hand direction to displace fluid from the master cylinder chamber 51 into the brake line 26 and to wheel cylinders 12 and 22.

Under low rates of deceleration of the motor vehicle brake applying force to the front wheel brakes 11 and rear wheel brakes 21 will be occasioned concurrently from the master cylinder 25 through the brake lines of the system irrespective of the supplementary control valve 30. This brake operation will be under conditions in which the brake apply force of the front wheel brakes and the rear wheel brakes is proportioned according to substantially normal static weight distribution of the vehicle on the front and rear axles respectively with a slight favor of increased brake force at the front wheels to compensate for some shift in load distribution of the vehicle to the front wheels during a low rate of deceleration of the vehicle.

The supplementary brake actuating device that effects a brake applying force to the front wheel brakes in proportion to the shift in load of the vehicle to the front wheel axle as a result of the deceleration rate of the vehicle is more particularly illustrated in Figure 3.

The supplementary brake actuating control comprises a body 90 that has a cylinder bore 91 in which a fluid displacement member 92 reciprocates. The fluid displacement member 92 is a rod-like member that has its two opposite ends journaled in the closure plugs 93 and 94 at opposite ends of the body 90. Seal members 95 and 96 prevent loss of high pressure fluid from the cylinder chamber 91. The right hand end of the rod 92 is disposed within a sleeve 97 that has a porous plug 98 in the end thereof to close the end of the rod 92 from entry of dirt around the rod.

The opposite end of the rod 92 is secured to a flexible diaphragm 100 that has its periphery secured between the flange 101 of the body 102 of a deceleration control responsive device and the flange 103 with a cup 104 that is secured on the end of the body 90 by means of the closure member 93. The diaphragm 100 thus divides the chamber in which it operates into two chambers 105 and 105a, the chamber 105 being adapted to receive vacuum through the line 38 in a manner hereinafter described, while the chamber 105a formed in the cup 104 is open to atmosphere through the opening 106.

The body 90 of the supplementary control device 30 has an inlet port 110 that is connected with the line 29 through which brake fluid under pressure is supplied from the master cylinder 25. The port 110 connects with the chamber 111 provided on the right hand side of the enlarged head 112 provided on the rod 92, the left hand side of the head 112 supporting a seal member 113 whereby the head and the seal functions as a piston in the cylinder 91 to effect displacement of fluid under pressure from the chamber 114 on the left hand side of the head 112.

Fluid is adapted to be displaced from the chamber 114 through the outlet passages 116 and 117, the outlet passage 117 being connected with the conduit 31 that supplies fluid under pressure to the wheel cylinders 12 of the front wheel brakes 11.

The conduit 116 connects with a recess 119 that contains a valve element 120 that is adapted to close a port 121 connecting the recess 119 with the chamber 111 so that hydraulic fluid under pressure can normally pass from the chamber 111 through the port 121 into the recess 119 and thence into the passage 116 for delivery into the conduit 31 for delivery to the front wheel brake cylinders 12.

Normally the valve 120 is retained in an open position as illustrated in Figure 3 by engagement of the head 112 on the rod 92 with the downwardly extending projection on the valve 120, a spring 125 normally urging the valve 120 in a downward position. So long as the rod 92 is in the full retracted position as shown in Figure 3 the head 112 on the rod will retain the valve 120 in the open position so that hydraulic brake fluid displaced in the master cylinder 25 can pass directly to the wheel cylinders 12 of the front wheel brakes 11. Also concurrently the hydraulic fluid under pressure will pass to the rear wheel brake cylinders 22 through the line 28 so that both front and rear wheel brakes are applied concurrently with equal pressure from the master cylinder 25. An air bleed valve 128 is provided in the closure member 129 for the recess 119.

The fluid displacement member 92 is operated to effect displacement of fluid under pressure from the chamber 114 into the line 31 in response to a control that responds to the rate of deceleration of the vehicle for increasing the pressure in the brake line 31 in proportion to the shift in load distribution of the vehicle to the front wheel brakes or front wheel axle as a result of the rate of deceleration of the vehicle. This control comprises a vacuum control valve 150 that operates in a valve bore 151 provided in the body 102. The valve 150 has the two enlarged portions 152 and 153 at opposite ends thereof and a recessed portion 154 intermediate the ends of the valve 150.

The body 102 has a recess forming an annulus chamber 155 around the enlarged portion 152 of the valve 150, this annulus chamber 155 being in flow connection with the chamber 105 on the left hand side of the diaphragm 100. A second annulus chamber 156 is provided around the upper enlarged portion 153 of the valve 150 and has flow connection with the chamber 105 on the left hand side of the diaphragm 100. The valve 150 has port passages 157 that connect the annulus passage 156 with the hollow interior 158 of the upper end of the valve 150 to provide for exhaust of fluid from the chamber 105 when the valve 150 is in the position of that illustrated in Figure 3, or in this specific instance, the passages 157 provide for admission of atmospheric air into the chamber 105 after operation of the valve in a manner hereinafter described.

An inlet port 160 connects with the conduit 38 which provides for vacuum source to be connected through the pipe 38 between the chamber 61a of the fluid pressure differential motor 35 with the recess chamber 154 of the valve 150. Vacuum is retained in the chamber 154 until such time as the valve 150 moves downwardly so that the lower end of the recess chamber 154 connects with the annulus passage 155 to allow vacuum connection between the pipe 38 and the chamber 105 on the left hand side of the diaphragm 100.

When vacuum is supplied to the chamber 105, the chamber is evacuated, the port passages 157 at this time being below the level of the annulus passage 156, so that the atmospheric pressure existing in the chamber 105a will cause the diaphragm 100 to move in a left hand direction against the action of the compression spring 165 to move the displacement member 92 and thereby cause fluid displacement through the pipe 31 into the wheel cylinders 12 of the front wheel brakes 11.

The valve 150 is under control of a weight member 170 that is secured to the lower end of an arm 171 suspended from a pivot 172. The arm 171 has an extension 173 that carries an actuating rod 174 for the valve 150 that is suspended from the pivot 175. The lower end of the rod 174 has an enlarged head 176 that is retained in the valve recess 158 by means of a snap ring 177. The weight 170 thus acts as a pendulum about the pivot 172 to effect vertical movement of the valve 150 upon swinging movement of the pendulum-like weight 170.

The auxiliary control 30 is positioned on the vehicle so that the swinging movement of the pendulum weight 170 will be longitudinally of the vehicle in a fore and aft direction. Thus when the vehicle is decelerated by the operator as a result of applying brakes of the vehicle the pendulum weight 170 will swing in a clockwise direction about the pivot 172 to effect a downward movement of the valve 150 and thereby connect the vacuum line 38 with the chamber 105 on the left hand side of the diaphragm 100. The evacuation of this chamber will cause operation of the fluid displacement member 92 to apply fluid under pressure to the line 31 to the front wheel brakes. It will be appreciated that the degree of swinging of the pendulum in a clockwise direction about the pivot 172 will be in proportion to the rate of deceleration of the vehicle, a slow deceleration rate having substantially no effect on the pendulum, but as the rate of deceleration increases the degree of movement of the pendulum about the pivot 172 will increase to a maximum until the pendulum strikes the cover 180 which acts as a stop to limit the maximum degree of movement of the valve 150 at which the passage 155 is fully open and the full effect of the vacuum in line 38 is applied to the chamber 105 to effect maximum power operation of the displacement member 92. Any lesser degree of opening of the chamber 155 will restrict the effect of the vacuum force in the pipe 38 and thereby proportionately reduce the power effect of the pressure differential fluid motor having the diaphragm 100 proportionately to the rate of deceleration of the vehicle.

The valve member 150 has a flexible diaphragm 195 secured on the lower end of the valve member with a diaphragm forming with the recess in which there is contained a chamber 196 that has a port connection 197 with the chamber 105. The upper side of the diaphragm 195 is therefore subject to the degree of vacuum present in the chamber 105 while the lower side of the diaphragm is subject to atmospheric pressure within the chamber formed by the valve cover 180.

Movement of the valve member 150 is a function of the relationship of the area of the reaction diaphragm 195 to the inertia movement of the pendulum 170. The degree of evacuation of chamber 105, and hence the force load applied to the rod 92 depends upon the vacuum value in the chamber 105 at which the reaction diaphragm 195, urged upwardly by atmospheric pressure, will produce a movement about the pivot 172, at least equal to, and preferably greater than the inertia movement of the pendulum 170. When the degree of vacuum in the chamber 105 is such that the upward movement of the diaphragm 195 overcomes the force of the pendulum action, the valve 150 will close, as shown in Fig. 3, to regulate the degree of force for movement of the plunger 92 and therefore the degree of pressure applied upon the hydraulic fluid to the front wheel brakes.

On initial application of the brake of the vehicle the chamber 105 will be at atmospheric pressure so that there will be no action of the plunger 92 through operation of the diaphragm 100 until the swing of the pendulum 170 is such as to move the valve 150 downwardly to open the chamber 105 to the vacuum line 38 through the chamber recess 155, whereafter the chamber 105 will be evacuated with left hand movement of the diaphragm 100 and with the valve 150 under control of the diaphragm 195 as heretofore described to limit the maximum force applied to the rod 92 in proportion to the deceleration rate of the vehicle as established by the cooperative operation of the pendulum 170 and the reaction diaphragm 195.

When the operator of the vehicle releases the brake, the chamber 61a of the main power brake booster or fluid motor 35 immediately returns to atmospheric pressure under control of the valve 75 with the result that atmospheric pressure is introduced into the chamber 105 so that the fluid pressure in the chambers 105 and 105a of the auxiliary control balance and allow the spring 165 to move the plunger 92 to the position illustrated in Figure 3.

The degree of vacuum applied into the chamber 105 from the chamber 61 is equivalent to the degree of vacuum in the chamber 61a as regulated therein by the valve element 65 of the pressure differential motor 35. Thus under a light brake application wherein the vacuum level in the chamber 61a will be at a lower value than under a heavy brake application, the same degree of vacuum will be available for delivery into the chamber 105 of the auxiliary control valve but the control of the vacuum level in the chamber 105 will still be under the control of the cooperating functional relationship of the reaction diaphragm 195 to the inertia movement of the pendulum 170. Thus regardless of the vacuum level in the primary control chamber 61a, the auxiliary control valve will at all times proportion the brake effort of the front wheels over the brake effort of the rear wheels by the inertia movement of the pendulum of the auxiliary control valve. Because the vacuum level in chamber 105 cannot be above the vacuum level in chamber 61a, the brake effort at the front wheels cannot exceed the brake effort applied at the rear wheels except under control of the inertia controlled device. As the severity of the brake application is increased by the operator through operation of the motor 35 it will be apparent that the severity of power application provided by the fluid motor 35 as well as by the auxiliary control 30 will increase in proportion to the severity of the brake application required by the operator of the vehicle but with the proportioning of the increase of brake effort of the front wheel over the rear wheel being fully under control of the auxiliary control 30, the result being that the brake effort of the rear wheels can at no time be greater than the brake effort applied at the front wheels.

While the form of embodiment of the invention as herein disclosed constitutes a preferred form, it is to be understood that other forms might be adopted as may come within the scope of the claims which follow.

What is claimed is as follows:

1. A brake system, including in combination, front and rear wheel hydraulically operated brakes of a vehicle, a first manually controlled power operated brake actuating mechanism including an hydraulic fluid displacement device in hydraulic connection with both said brakes to operate the same concurrently upon actuation of a pressure differential motor connected to said fluid displacement device to actuate the same under control of manually operated control valve means controlling fluid pressure on one side of said motor for pressure differential operation of the motor to actuate the said device thereby, and a second brake actuating mechanism including an hydraulic fluid displacement device in hydraulic connection with said front brake only for actuation thereof upon actuation of a pressure differential motor connected to said fluid displacement device to actuate the same under control of control valve means actuated by means responsive to the deceleration rate of the vehicle, said second mentioned fluid motor receiving fluid pressure for operation thereof from first mentioned fluid motor.

2. A brake system in accordance with claim 1 wherein the means responsive to the deceleration rate of the vehicle is effective for operation of the control valve actuated thereby only above a predetermined deceleration rate of the vehicle.

3. A brake system, including in combination, front and rear wheel hydraulically operated brakes of a vehicle, a first manually controlled power operated brake actuating mechanism including an hydraulic fluid displacement device in hydraulic connection with both said brakes to operate the same concurrently upon actuation of a pressure differential motor connected to said fluid displacement device, manually operated control valve means controlling fluid pressure on one side of said motor for pressure differential operation of the motor to actuate said device, and a second brake actuating mechanism including an hydraulic fluid displacement device in hydraulic connection with said front brake only for actuation thereof upon actuation of a pressure differential motor connected to said fluid displacement device, control valve means actuated by means responsive to the deceleration rate of the vehicle, said control valve means responsive to the deceleration rate of the vehicle having connection with said first mentioned fluid displacement device to proportion the response of the said deceleration rate responsive means in proportion to the pressure received in said second mentioned motor.

4. A brake system, including in combination, front and rear wheel hydraulically operated brakes of a vehicle; a first manually controlled power operated brake actuating mechanism including an hydraulic fluid displacement device in hydraulic connection with both said brakes to operate the same concurrently upon actuation of a pressure differential motor connected to said fluid displacement device to actuate the same under control of manually operated control valve means controlling fluid pressure on one side of said motor for pressure differential operation of the motor to actuate said device thereby; and a second brake actuating mechanism including an hydraulic fluid displacement device in hydraulic connection with said front brake only for actuation thereof, valve means in the said hydraulic connection with said front brake only and normally opened on inactivity of said second mentioned hydraulic fluid displacement device to effect fluid flow bypass of fluid displaced from said first mentioned fluid displacement device to said front brake, a second pressure differential motor connected to said second mentioned fluid displacement device to actuate the same, control valve means controlling flow of fluid pressure from said first mentioned motor to said second mentioned motor, and means responsive to deceleration rate of the vehicle connected to said last mentioned control valve means to operate the same in response to the deceleration rate of the vehicle for supply of fluid pressure from said first mentioned motor to said second mentioned motor when the deceleration rate of the vehicle is at or above a predetermined value.

5. A brake system, including in combination, front and rear wheel hydraulically operated brakes of a vehicle; a first manually controlled power actuated brake actuating mechanism including an hydraulic displacement device in hydraulic connection with both said brakes to operate the same concurrently upon actuation of a pressure differential motor connected to said fluid displacement device to actuate the same under control of manually operated control valve means controlling fluid pressure on one side of said motor for pressure differential operation of the motor to actuate said device thereby; and a second brake actuating mechanism including an hydraulic displacement device in hydraulic connection with said front brake only for actuation thereof, valve means actuated by said device and normally held in open position by said device while in inactive position to provide bypass of fluid flow around said second mentioned fluid displacement device from said first fluid displacement device to said front wheel brake, a pressure differential motor connected to said second mentioned fluid displacement device to actuate the same, control valve means for supplying fluid pressure from said first mentioned motor to said second mentioned motor, means responsive to the deceleration rate of the vehicle connected with said last mentioned control valve means to actuate the same in response to the deceleration rate of the vehicle for supply of fluid pressure from said first motor to said second motor and actuate thereby said fluid displacement device of said second brake actuating mechanism to effect closing of said bypass valve and thereafter effect fluid displacement to said front wheel brake only in proportion to the deceleration rate of the vehicle.

6. A brake system, including in combination, front and rear wheel hydraulically operated brakes of a vehicle; a first manually controlled power actuated brake actuating mechanism including an hydraulic displacement device in hydraulic connection with both said brakes to operate the same concurrently upon actuation of a pressure differential motor connected to said fluid displacement device to actuate the same under control of manually operated control valve means controlling fluid pressure on one side of said motor for pressure differential operation of the motor to actuate said device thereby; and a second brake actuating mechanism including an hydraulic displacement device in hydraulic connection with said front brake only for actuation thereof, valve means actuated by said device and normally held in open position by said device while in inactive position to provide bypass of fluid flow around said second mentioned fluid displacement device from said first fluid displacement device to said front wheel brake, a pressure differential motor connected to said second mentioned fluid displacement device to actuate the same, control valve means for supplying fluid pressure from said first mentioned motor to said second mentioned motor, means responsive to the deceleration rate of the vehicle connected with said last mentioned control valve means to actuate the same in response to the deceleration rate of the vehicle for supply of fluid pressure from said first motor to said second motor and actuate thereby said fluid displacement device of said second brake actuating mechanism to effect closing of said bypass valve and thereafter effect fluid displacement to said front wheel brake only in proportion to the deceleration rate of the vehicle; and means responsive to the pressure fluid supplied to said second mentioned motor from said first mentioned motor and connected with said means responsive to the deceleration rate of the vehicle to control movement thereof and thereby control movement of the valve means for said second mentioned motor for supply of pressure fluid to the second mentioned motor from the first mentioned motor in proportion to the deceleration rate of the vehicle to increase the brake effort applied by the front wheel brake over the rear wheel brake in proportion to the deceleration rate of the vehicle.

7. A brake system, including in combination, front and rear wheel hydraulically operated brakes of a vehicle, a first manually operated brake actuated mechanism in hydraulic connection with said front and rear wheel brakes to operate the same concurrently and including a fluid pressure differential motor for power operation of the mechanism, a second brake actuating mechanism in hydraulic connection with said front wheel brake only and including a fluid pressure differential motor for power operation of the mechanism, said second mechanism including valve means providing for direct hydraulic connection of said first mechanism with said front wheel brake and additional means to render said valve means ineffective to close off said direct hydraulic connection and create brake operating pressure in said front wheel brakes in addition to that created in the rear wheel brakes by the said first mechanism; and means actuated in response to the deceleration rate of the vehicle to render the fluid pressure differential motor of said second mechanism effective to actuate said additional means to increase brake force in the front wheel brake over the rear wheel brake in proportion to the deceleration rate of the vehicle.

8. In a brake system for controlling brake applying force to the front wheel brake increasingly over the rear wheel brake of a vehicle in proportion to the transfer of weight distribution from the rear wheel to the front wheel of a vehicle caused by the deceleration rate of the vehicle and in proportion thereto, a manually controlled fluid power operated brake actuating mechanism for normal application of brake applying force to the front and rear wheel brakes concurrently, and a second fluid power operated brake actuating mechanism for application of brake applying force to the front wheel brake only in addition to the brake applying force applied to the rear wheel brake by the first mentioned mechanism including mechanically controlled valve means responsive to the deceleration rate of the vehicle actuating the said second mentioned mechanism to proportion the increase of brake applying pressure at the front brake over the rear wheel brake in proportion to the deceleration rate of the vehicle, said second mentioned valve mechanism having fluid connection with said first mentioned mechanism to receive fluid pressure from the first mentioned mechanism to operate the said second mechanism only after active operation of the first mentioned mechanism.

9. In a brake system for controlling brake applying force to the front wheel brake increasingly over the rear wheel brake of a vehicle in proportion to a transfer of weight distribution from the rear wheel to the front wheel of a vehicle caused by the rate of deceleration of the vehicle and in proportion thereto, a control valve for increasing brake applying effort to the front wheel brake over the rear wheel brake in proportion to the rate of deceleration of the vehicle, including, means forming a fluid displacement device which includes a fluid displacement member, a pressure differential motor connected to said member to actuate the same to provide brake applying pressure to only the front wheel brake of the vehicle, valve means actuated by movement of said member and normally held in open position by said member to provide for bypass of fluid around said device, valve means controlling flow of power fluid to said motor, and means responsive to the rate of deceleration of the vehicle connected to said last mentioned valve means to actuate the same whereby to actuate said member to close said valve means actuated thereby and displace fluid under pressure to the front wheel brake.

10. In a brake system for controlling brake applying force to the front wheel brake increasingly over the rear wheel brake of a vehicle in proportion to a transfer of weight distribution from the rear wheel to the front wheel of a vehicle caused by the rate of deceleration of the vehicle and in proportion thereto, a control valve for increasing brake applying effort to the front wheel brake over the rear wheel brake in proportion to the rate of deceleration of the vehicle, including, means forming a fluid displacement device which includes a fluid displacement member having one inactive position, a pressure differential motor connected to said member to actuate the same to provide brake applying pressure to only the front wheel brake of the vehicle, resilient means urging said motor to one position to place said member in its inactive position, valve means actuated by movement of said member and normally held in open position by said member when in its inactive position, valve means controlling flow of power fluid to said motor, and means responsive to the rate of deceleration of the vehicle connected to said last mentioned valve means to actuate the same whereby to actuate said member to close said valve means actuated thereby and displace fluid under pressure to the front wheel brake.

References Cited in the file of this patent
UNITED STATES PATENTS

| | | |
|---|---|---|
| 2,073,163 | Martin | Mar. 9, 1937 |
| 2,115,071 | Hunt | Apr. 26, 1938 |